Figure 5:
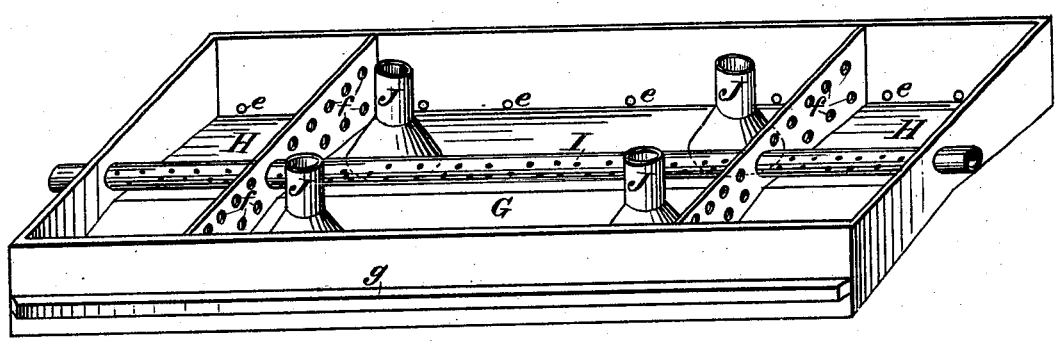

3 Sheets—Sheet 1.
E. B. SMITH, G. L. FREEMAN & D. H. BURRELL.
Cheese-Vat.
No. 203,952. Patented May 21, 1878.
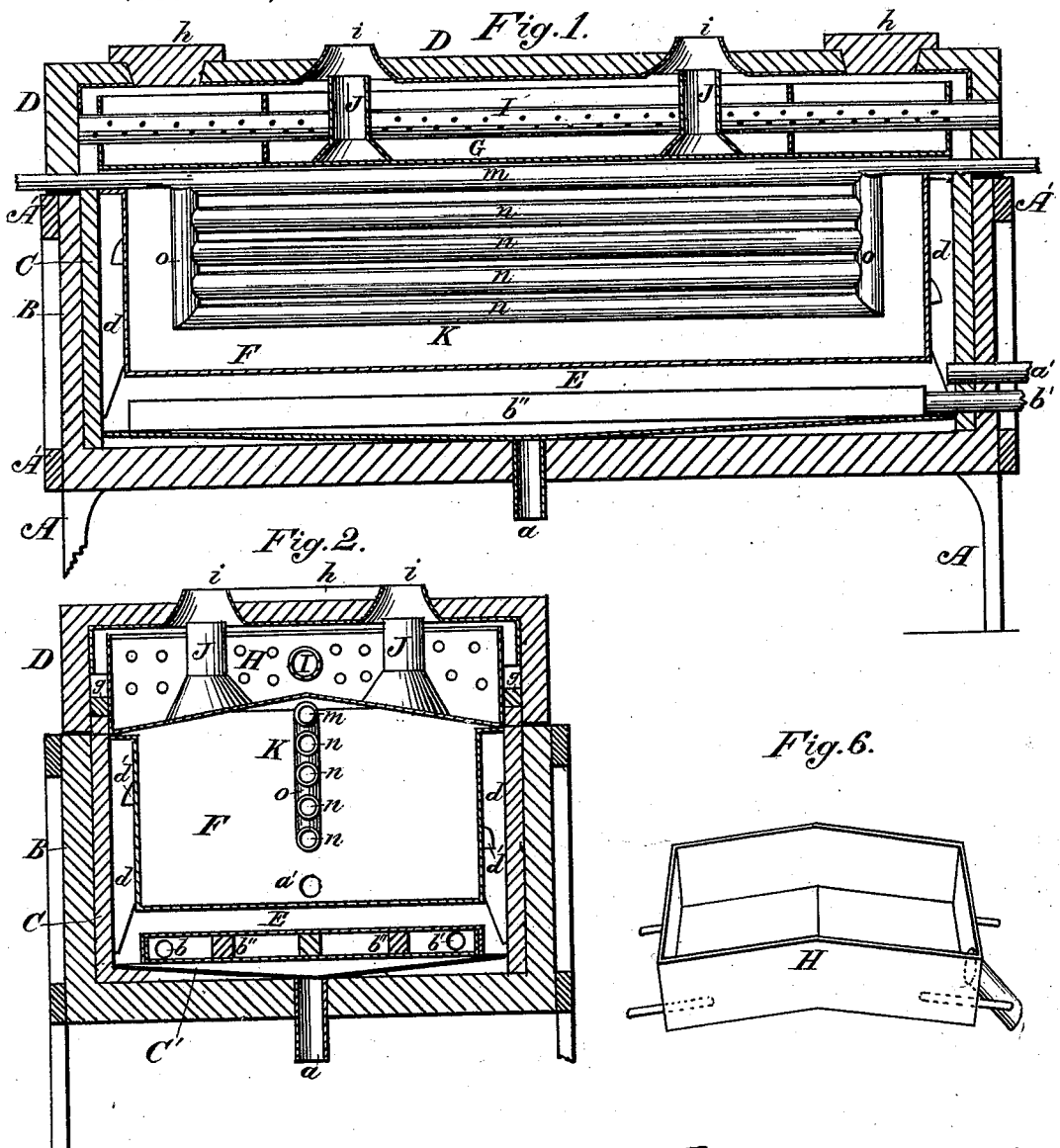
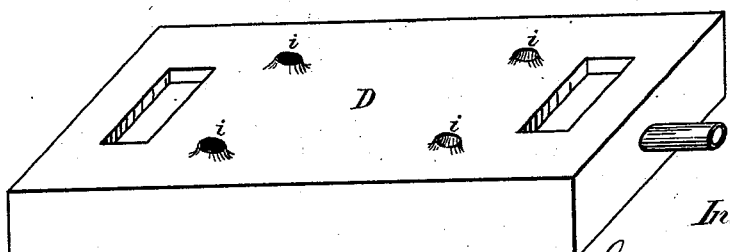
Attest:
F. H. Schott
Fred E. Tasker.
Inventor:
Edgar B. Smith
George L. Freeman
David H. Burrell
by J. C. Tasker & Co, attys 3 Sheets—Sheet 2.

E. B. SMITH, G. L. FREEMAN & D. H. BURRELL.
Cheese-Vat.

No. 203,952. Patented May 21, 1878.

Attest:
F. H. Schott.
Fred E. Tasker.

Inventor:
Edgar B. Smith
George L. Freeman
David H. Burrell
by John C. Tasker, atty 3 Sheets—Sheet 3.

E. B. SMITH, G. L. FREEMAN & D. H. BURRELL.
Cheese-Vat.

No. 203,952. Patented May 21, 1878.

Attest:
F. H. Schott.
Fred E. Tasker.

Inventor:
Edgar B. Smith
George L. Freeman
David H. Burrell
per John C. Tasker H. attys

N. PETERS, PHOTO-LITHOGRAPHER, WASHINGTON, D. C.

UNITED STATES PATENT OFFICE.

EDGAR B. SMITH, OF ALBANY, AND GEORGE L. FREEMAN AND DAVID H. BURRELL, OF LITTLE FALLS, ASSIGNORS TO WHITMAN & BURRELL, OF LITTLE FALLS, NEW YORK.

IMPROVEMENT IN CHEESE-VATS.

Specification forming part of Letters Patent No. 203,952, dated May 21, 1878; application filed February 9, 1878.

*To all whom it may concern:*

Be it known that we, EDGAR B. SMITH, of the city of Albany, county of Albany, and GEORGE L. FREEMAN and DAVID H. BURRELL, of Little Falls, Herkimer county all in the State of New York, have invented certain new and useful Improvements in Vats for Milk, of which the following is such a full, clear, and exact description as will enable others to make and use the same, reference being had to the accompanying drawings, forming a part of this specification, in which similar letters of reference indicate corresponding parts in the different figures.

The object of this invention is to provide for the use in cheese-factories and dairies an improved milk-pan, which is used alternately either as a refrigerating or heating pan, so that the milk may be quickly heated to such a degree as the purpose to which it is to be adapted requires, and then as suddenly cooled, or the milk may be maintained at any desired temperature for a length of time in order to facilitate the various processes and operations carried on in the dairy during the manufacture of butter and cheese.

Among the difficulties which it has been found necessary to overcome in perfecting this invention may be named the following: Heretofore milk, when set for cream, has generally been put in pans or pails, placed in a pool of cold water, or in vats holding large quantities of milk, and situated in a milk-room constructed expressly for the purpose at much expense, as it was necessary to keep the atmosphere of the room, as well as the milk, cool, for, when the milk was cooled by artificial means to a lower temperature than that of the air of the room in which it was placed, condensation would take place upon the surface of the milk, and it would become impregnated with the odors always arising in such places.

In order to avoid these difficulties, and to improve the apparatus so that better facilities shall be afforded the operation for the management of milk during its conversion into butter and cheese, we have devised an apparatus, which will now be fully described; and our invention consists in so constructing the outer cases inclosing the milk-vat as to render them nearly perfect non-conductors of heat and cold; also, in forming beneath the vat a chamber containing pipes or equivalent devices, for the purpose of introducing hot or cold water or steam, as either may be found necessary during the manipulation of the contents of the vat; also, in the introduction of a peculiarly-constructed swinging pipe-coil within the vat, for the purpose of increasing or diminishing the temperature of its contents as the coil is supplied with cold or hot water, or other fluid capable of carrying and imparting heat or cold; also, in the construction and arrangement of suitable ice-pans, to be placed above the milk-vat; also, in an air-tight non-conducting cover, to be placed over the vat when it is desired to prevent its contents from coming in contact with the outer air; and, further, in providing the apparatus with agitating devices, by which the contents of the vat may be churned or agitated; and in certain combinations and arrangements of the several parts, as will be hereinafter fully described, and then clearly defined in the claims.

Figure 3:
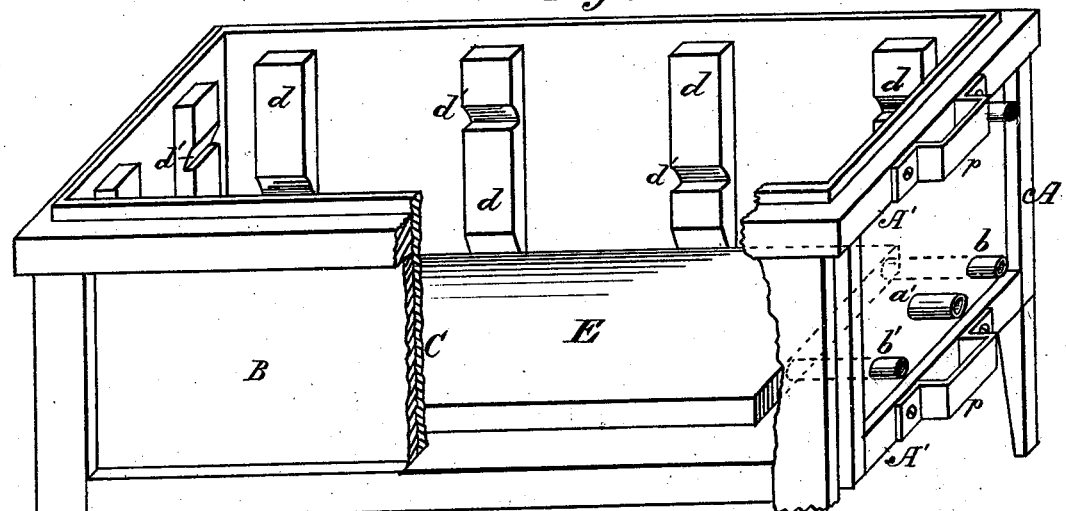
Figure 4:
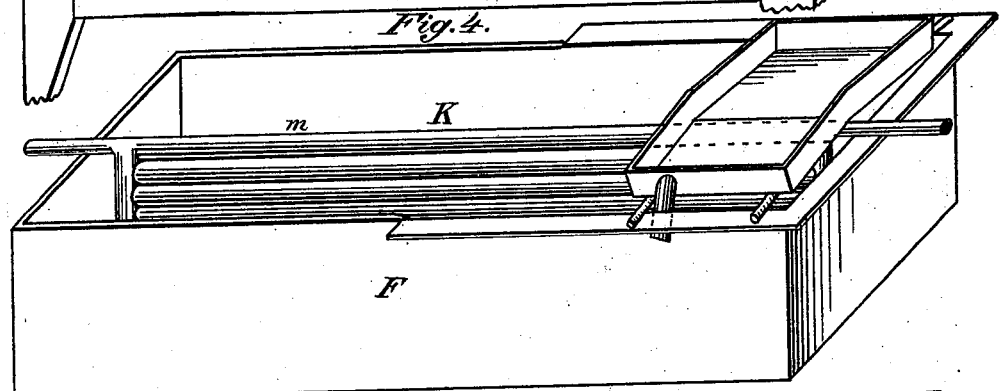
Figure 8:
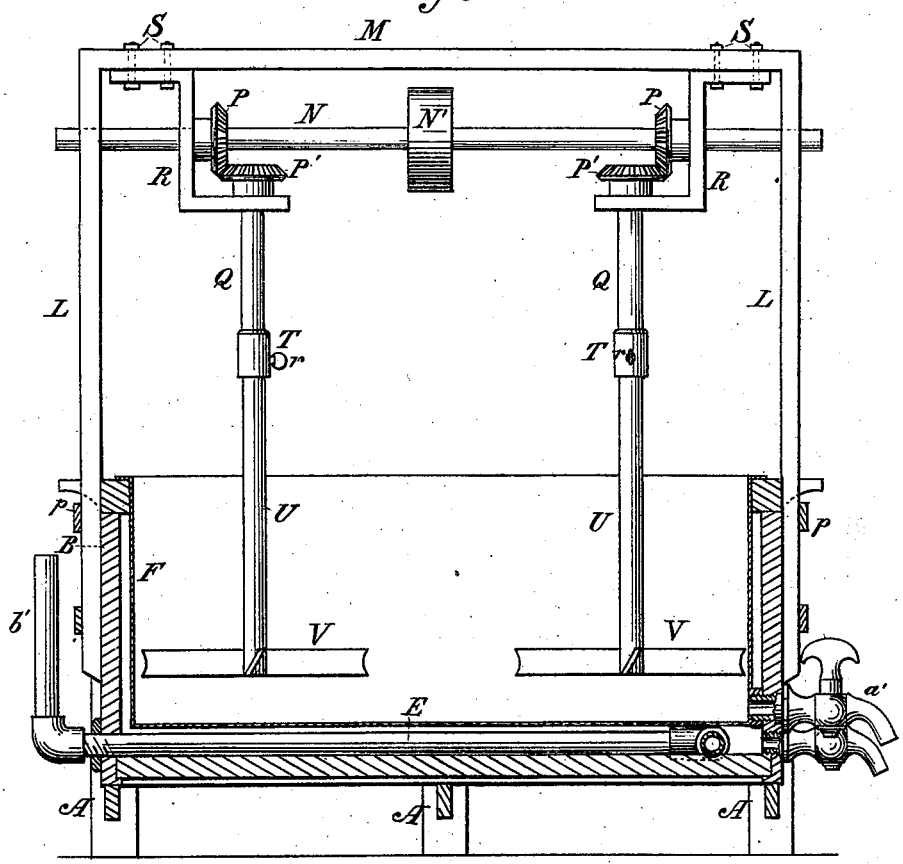
Figure 9:
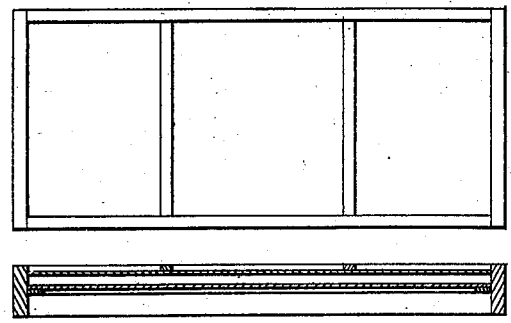

In the accompanying drawings, Figure 1 is a vertical longitudinal section through the vat, ice-pan, and cover. Fig. 2 is a vertical cross-section of the same. Fig. 3 is a perspective view of the outer casing of the vat, a part of one of its walls being broken away to more fully show its construction. Fig. 4 shows the milk-receptacle itself, with the removable pipe coil in position within it. Fig. 5 is a perspective view of the ice-pan, Fig. 6 being a modification of the same, to be used under circumstances hereinafter described. Fig. 7 shows the cover of the vat, also in perspective. Fig. 8 is a longitudinal section through the vat, showing the method of applying and operating the agitating or churning devices. Fig. 9 is a plan and section of a cover for closing the vat.

The outer casing of the vat is preferably constructed of wood, made double, with sheets of paper introduced between the parts, as being a cheap material and a poor conductor of heat; but any other suitable non-conducting material having the other necessary requisites may be used instead of this; and it consists of a rectangular framing formed of the vertical posts A, the longer ends of which form legs of a suitable height, which posts are connected to each other by the girts A'. Within this frame and suitably secured to it is placed the material which forms the outer walls B of the vat. A lining, C, also of wood, is placed within the outer walls of the vat, and projects sufficiently above them to form a ledge, over which the cover D shuts. Between this outer case and the lining veneer may be interposed a layer of paper, to increase the non-conducting properties of the case. Upon the wooden bottom of the vat is placed the concave metallic bottom C', having at its lowest point an outlet-tube, $a$, through which the waste-water passes, or through which, when a change in the temperature of the air surrounding the vat is desired for the inclosed milk, a current of air may be allowed to pass, and which, after passing around the inner milk reservoir or tank, may escape through openings in the cover.

Resting upon the concave bottom C' is a rectangular sheet-metal tank, E, provided with the inlet and outlet openings or pipes $b$ $b'$ and partitions $b''$, the latter being for the purpose of controlling the flow of the heating or refrigerating fluid, causing it to pass from end to end of the tank, thus giving it an equal temperature in all its parts.

An additional pipe may be inserted in the end of the casing, through which a fluid may be passed into the space between the milk-receptacle and the outer casing; or, if it be desired to immerse only its bottom in the hot or cold water, this pipe forms a ready means of regulating its height.

Secured to the inner casing C is a series of vertical cleats, $d$, which nearly fill the space between the outer case and the milk-receptacle F. These cleats have formed in them recesses $d'$, through which the circulating fluid passes, thus permitting it to maintain an equable temperature upon all parts of the outer surface of the receptacle F. This receptacle corresponds in form with the outer case, and is preferably of metal, although other materials might be used, as glass or porcelain; but they, although beneficial in some respects, are lacking in one very important feature—that is, capacity for conducting heat quickly. I therefore prefer metal to all other materials for their construction.

The upper edge of the receptacle is formed with a flange, that rests upon the top of the cleats $d$, or upon the inner edge of the vat, which thus supports the receptacle in proper position and with considerable rigidity and strength, allowing it to be formed of thin material. From one end of the receptacle issues the pipe $a'$, through which the contents may be drawn off, when desired.

A pipe-coil, $k$, composed of the horizontal pipe $m$, which is provided at its ends with suitable coupling devices to enable it to be attached to other pipes conveying either a heating or refrigerating fluid, and a series of shorter pipes, $n$, connected with the pipes $m$ by the vertical branches $o$, is suspended within the milk-receptacle, and, from its peculiar construction, may be readily removed therefrom, when desired. It also admits of a vibratory motion, the coil swinging upon its supports, thus agitating the milk and causing an equable heat throughout its mass.

Resting upon the upper edge of the inner casing C is the ice-pan G, the bottom of which is of convex form, so that the liquids within the pan shall all run to the sides, where, at the junction of the sides and bottom, is formed a series of perforations, $e$, through which the ice-water falls in a shower, and passes down between the casing and the milk-receptacle.

A perforated partition, $f$, near each end of the pan forms the ice-chambers H, into which the ice is placed through suitable openings in the cover D. Running longitudinally through the middle of the ice-pan is a perforated tube, I, through which a current of cold water may be forced when the ice is not used, where this is more easily obtained than ice. The water running through the tube passes out of the minute perforations in its under side in the form of spray, striking all portions of the upper surface of the pan's bottom, and then percolating downward, through the holes $e$, between the milk-receptacle and the sides of the outer case. Four or more vertical pipes, J, provided with a conical base, rise from the bottom of the pan and pass into suitable outlets in the cover. These pipes serve to carry off all effluvia which may rise from the milk during the operations of heating and cooling, also serving as places of exit for air, when air is used instead of water or steam for heating the milk; and they may be connected by suitable pipes with a chimney-flue, so as to prevent any escape of the air or effluvia into the dairy. After the heating of the milk is finished, and it is again cooled, these pipes may be closed in any suitable manner, in order to prevent the milk from acquiring any disagreeable odor by the entrance of air to the vat through them. Strips of wood $g$ are secured to the sides of the ice-pan, which rest upon the upper edge of the inner case C, and support it in its proper position. A modification of this ice-pan is shown in Fig. 6 of the drawings, which represents one section of a sectional pan, and may be found advantageous when the apparatus is large, as, being formed in sections, it is more easily removed and replaced.

The cover D, which I prefer to construct of metal, is composed of an outer and inner shell, having an air-space between them, thus rendering it almost a perfect non-conductor of heat. It may, however, be made of some of the preparations of paper peculiarly adapted to such purposes. Its lower edge, when in place, rests upon the casing B, and is provided with a layer of felt or other similar flexible non-conductor, for the purpose of forming a tight joint between them. Openings are formed in its top over the ice-chambers H, and closed by the doors h, so that the ice-supply may be renewed, if desired, without removing the whole cover. Other openings, i, receive the pipes J, rising from the ice-pan; or, if desired, it may be made without openings, the parts being so constructed that it will form, when applied, an air-tight cover over all.

L L are two vertical supports, which pass through loops p p, secured to the ends of the outer case of the vat, so arranged that the supports, together with the cross-piece M, by which they are connected, and the mechanism they carry, may be removed at will. This mechanism consists of a shaft, N, placed horizontally above the vat, and provided with a suitable driving-pulley, N', receiving its rotation from any suitable motor. Secured upon this shaft are two or more bevel-gear wheels, P, which engage with similar wheels, P', secured to the upper ends of the vertical shafts Q, which rotate in bearings attached to the brackets R, these brackets being secured to the cross-piece M by bolts s, or other suitable means. To the lower ends of the shafts Q are attached sockets T, into which the shafts U of the agitators are secured by means of a set-screw, r. These agitator-shafts are provided at their lower ends with blades V, that are placed in an inclined position, similar to that of the blades of a screw-propeller, and produce in their rotation a corresponding movement of the milk, causing that which is at the surface to roll under and occupy the place of that which was previously at the bottom, thus causing a perfect mixture, and rendering the whole mass homogeneous.

In operating this device, the milk is placed in the receptacle in its fresh state as soon as possible after being drawn from the cow, its animal heat still remaining. Then, if it be desired to convert it into butter or cheese, or both, heat is supplied by means of a current of hot air, steam, or hot water, which is forced into the tank E through the pipe b, finding its outlet through the pipe b' after having circulated through the different compartments of the tank. Another current of heating fluid is passed through the coil K, being introduced into one end of the pipe m, and, after circulating through the coil, making its exit by the opposite end of the pipe m; and an additional means of introducing heat is furnished by the perforated pipe I passing through the ice-pan, through which hot water or steam may be forced, thus heating the bottom of the pan, and, in its passage to the outlet-pipe a at the bottom of the vat, heating the sides of the milk-receptacle, down which it trickles. After the milk has been raised to the desired heat needed, which is about 140° Fahrenheit, it is cooled as quickly as possible by changing the hot currents of air, steam, or water in the tank E and pipe-coil K to currents of cold air or water, shutting off the supply of hot water or steam from the pipe I, and supplying its place with a cold current, which causes a constant percolation of water over the bottom of the ice-pan, through the openings e, and down the sides of the milk-receptacle. In this way it is cooled rapidly to about 60°, when the pans, filled with ice, are placed in position, and over all is put the air-tight cover, by which we exclude the atmosphere of the room, thereby cooling from the top, and keeping the milk free from all taint, which so often lurks in the atmosphere; and in this we learn the value of these covers made with an internal air-space, but excluding wholly the outer air, thus giving such perfect control over the temperature of the milk as to greatly facilitate further operations. The milk is now allowed to rest or sit twenty-four to thirty-six hours, when the cream is removed and churned in its sweet condition, producing excellent butter. The skim milk is then agitated or churned by the apparatus described in connection with this vat, or by other suitable means, for fifteen or twenty minutes, for the purpose of producing a fermentation, thereby ripening the milk. While this agitation is in process we add to the contents of the vat the sweet buttermilk. The whole is then heated to about 80°. Rennet is then added in sufficient quantities to coagulate the milk in fifteen minutes.

Several advantages result from this invention. The placing of the coils perpendicularly enables the cream to rise to the surface without encountering any obstacle, and, as the first and second pipes of the coil are above the milk, the air under the cover and over the milk is cooled when cold air is passed through the pipes, and as cold descends the whole mass of milk is rapidly cooled thereby. Moreover, nearly all the vats in ordinary use have a wooden outer case, with an inner tin receptacle for the milk, with a space between them, on the sides, ends, and bottom, and it is only necessary to construct a cover and tin ice-pans to fit the milk-receptacle, punch holes in its sides for the drip from the ice-pans to enter the space surrounding the milk, to convert such a vat into an excellent creamery-vat, the best known for setting milk for cream.

Another advantage is that the milk may be converted into cheese without removing it from the vat until after the separation of the curd from the whey, when the latter may be drawn off and the curd removed to the press.

Having thus described our invention, we claim as new, and desire to secure by Letters Patent of the United States, the following:

1. In a milk-vat, the outer case composed of the two separate non-conducting layers B and C, constructed and arranged as shown and described, in combination with the cleats d, for the purpose of securing an air-space and non-conducting envelope to the milk-receptacle F, substantially as set forth.

2. In a milk-vat, the outer casing constructed of wood, as shown and described, and provided with the metallic bottom C', in combination with the tank E, having inlet and outlet pipes and internal divisions for causing a circulation of the inclosed fluid, all constructed and arranged as and for the purpose specified.

3. In a milk-vat, the combination of the double outer casing, the tank E, the milk-receptacle, and the devices, constructed and arranged as shown and described, for causing a circulation of heating or cooling fluids between them, as hereinbefore described.

4. In a milk-vat, in combination with the milk-receptacle, the freely-swinging pipe-coil K, so constructed and arranged as to be used for heating or cooling the milk, substantially as and for the purpose specified.

5. In a milk-vat, the ice-pan, constructed substantially as shown and described, and provided with ice-chambers H and perforated tube I, for the purpose specified.

6. The ice-pan provided with the perforated tube I and ventilating-pipes J, in combination with the cover D, as and for the purpose set forth.

7. In a milk-vat, the cover D, constructed as shown and described, and openings $i$, in combination with the outer casing and interposed packing-strips, as and for the purpose set forth.

8. The combination, in a milk-vat, of an air-tight cover, refrigerating ice-pans, a swinging pipe-coil, and milk-receptacle, these devices being arranged for alternately heating or cooling the contents of the milk-receptacle, substantially as specified.

9. The process hereinbefore described of treating milk, by placing it in the vat as drawn, heating it to a temperature of 140° by steam or currents of hot air, then cooling it quickly by the refrigerating means shown and described, and covering the vat with an air-tight non-conducting cover until the cream has separated from the milk, all substantially as and for the purpose specified.

In testimony that we claim the foregoing as our invention we hereunto affix our signatures in the presence of two witnesses this 21st day of January, 1878.

EDGAR B. SMITH.
GEO. L. FREEMAN.
DAVID H. BURRELL.

Witnesses:
WATTS T. LOOMIS,
SIDNEY A. LOOMIS.